(12) United States Patent
Lin et al.

(10) Patent No.: US 10,181,782 B2
(45) Date of Patent: Jan. 15, 2019

(54) FLYBACK POWER CONVERTER CIRCUIT WITH ACTIVE CLAMPING AND ZERO VOLTAGE SWITCHING AND CONVERSION CONTROL CIRCUIT THEREOF

(71) Applicant: RICHTEK TECHNOLOGY CORPORATION, Zhubei, Hsinchu (TW)

(72) Inventors: Kun-Yu Lin, Pingtung (TW); Tzu-Chen Lin, Changhua (TW); Wei-Hsu Chang, Hsinchu (TW); Ta-Yung Yang, Taoyuan (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 15/892,724

(22) Filed: Feb. 9, 2018

(65) Prior Publication Data

US 2018/0301975 A1    Oct. 18, 2018

Related U.S. Application Data

(60) Provisional application No. 62/486,771, filed on Apr. 18, 2017.

(30) Foreign Application Priority Data

Jul. 21, 2017  (TW) .............................. 106124520 A

(51) Int. Cl.
*H02M 3/335*   (2006.01)
*H02M 1/34*   (2007.01)
(Continued)

(52) U.S. Cl.
CPC ............ *H02M 1/083* (2013.01); *H02M 1/088* (2013.01); *H02M 3/33569* (2013.01); *H02M 2001/0009* (2013.01); *H02M 2001/0058* (2013.01)

(58) Field of Classification Search
CPC . H02M 2001/0058; H02M 2001/0009; H02M 3/335; H02M 3/33507;
(Continued)

(56) References Cited

U.S. PATENT DOCUMENTS 9,941,798 B2 *    4/2018  Krueger ............ H02M 3/33507
2017/0257033 A1 *    9/2017  Liu .................... H02M 3/33507

* cited by examiner

*Primary Examiner* — Gary L Laxton
(74) *Attorney, Agent, or Firm* — Tung & Associates

(57) ABSTRACT

A flyback power converter circuit includes: a transformer including a primary side winding coupled to an input power and a secondary side winding coupled to an output node, wherein the input power includes an input voltage; a primary side switch coupled to the primary side winding for controlling the input power to generate an output power on the output node through the secondary side winding, wherein the output power includes an output voltage; a clamping circuit including an auxiliary switch and an auxiliary capacitor connected in series to form an auxiliary branch which is connected with the primary side winding in parallel; and a conversion control circuit for adjusting an ON time of the auxiliary switch according to at least one of a current related signal, the input voltage, and the output voltage, such that the primary side switch is zero voltage switching when turning ON.

19 Claims, 7 Drawing Sheets

(51) Int. Cl.
*H02M 1/08* (2006.01)
*H02M 1/088* (2006.01)
*H02M 1/00* (2006.01)

(58) Field of Classification Search
CPC ......... H02M 3/33523; H02M 3/33569; H02M 1/34; H02M 2001/342; H02M 2001/344
See application file for complete search history.

FLYBACK POWER CONVERTER CIRCUIT WITH ACTIVE CLAMPING AND ZERO VOLTAGE SWITCHING AND CONVERSION CONTROL CIRCUIT THEREOF

CROSS REFERENCE

The present invention claims priority to U.S. 62/486,771, filed on Apr. 18, 2017, and TW 106124520, filed on Jul. 21, 2017.

BACKGROUND OF THE INVENTION

Field of Invention

The present invention relates to a flyback power converter circuit; particularly, it relates to a flyback power converter circuit with active clamping and zero voltage switching. The present invention also relates to a conversion control circuit for use in the flyback power converter circuit.

Description of Related Art

FIG. 1 shows a prior art flyback power converter circuit with active clamping (flyback power converter circuit 1). The flyback power converter circuit 1 converts an input voltage to an output voltage. The flyback power converter circuit 1 includes an auxiliary switch S2 and an auxiliary capacitor Cr which form an active clamping branch. The active clamping branch is conductive when the primary side switch S1 is OFF, such that the energy stored in the parasitic leakage inductance Lr and the parasitic magnetizing inductance Lm during the ON time of the primary side switch S1 can be transferred and stored in the auxiliary capacitor Cr by this branch. Besides, before the primary side switch S1 is turned ON, the parasitic capacitor Coss of the primary side switch S1 can be discharged by the energy stored in the auxiliary capacitor Cr, such that the primary side switch S1 is zero voltage switching when turning ON. In this prior art, the auxiliary switch S2 switches in opposite phase (i.e. complementarily) with the primary side switch S1.

The prior art circuit in FIG. 1 has a drawback that, because the auxiliary switch S2 switches inversely with the primary side switch S1, the ON time of the auxiliary switch S2 may be too long to cause a large circulation current, leading to high power loss.

FIG. 2 shows schematic waveforms of another prior art flyback power converter circuit with active clamping. This prior art is similar to FIG. 1 but is different in that the ON time TON2 of the auxiliary switch S2 is a constant time period (constant ON time).

The prior art circuit in FIG. 2 has a drawback that, because the ON time TON2 of the auxiliary switch S2 is a fixed time period, when for example in applications with a high input voltage VI, the ON time TON2 of the auxiliary switch S2 may not be long enough to fully discharge the parasitic capacitor Coss, and in this case the primary side switch S1 cannot achieve zero voltage switching when turning ON, leading to undesired power loss.

Compared to the prior art in FIGS. 1 and 2, the present invention is advantageous in that the ON time TON2 of the auxiliary switch S2 is adjustable to ensure that the primary side switch S1 switches by zero voltage switching, whereby the power conversion efficiency can be improved.

SUMMARY OF THE INVENTION

From one perspective, the present invention provides a flyback power converter circuit, comprising: a transformer, which includes a primary side winding coupled to an input power and a secondary side winding coupled to an output node, wherein the input power includes an input voltage and an input current; a primary side switch, coupled to the primary side winding, and configured to operably control the primary side winding to convert the input power such that the secondary side winding generates an output power on the output node, wherein the output power includes an output voltage and an output current; a clamping circuit, including: an auxiliary switch; and an auxiliary capacitor, coupled to the auxiliary switch in series to form an auxiliary branch which is coupled with the primary side winding in parallel; and a conversion control circuit, configured to operably generate a primary side switch control signal and an auxiliary switch control signal to control the primary side switch and the auxiliary switch respectively to convert the input power to the output power, wherein the auxiliary switch and the primary side switch do not switch complementarily to each other, the conversion control circuit including: an auxiliary switch control circuit, configured to operably control the auxiliary switch according to at least one of the followings: (1) a current related signal, (2) the input voltage, and/or (3) the output voltage, such that a voltage difference between a current inflow terminal and a current outflow terminal of the primary side switch is substantially zero when the primary side switch turns ON, whereby zero voltage switching is achieved, wherein the current related signal relates to at least one of the followings: (1) the output current, (2) a conduction current of the primary side switch, and/or (3) a conduction current of the primary side winding; and a signal sensing circuit, configured to operably sense the current related signal, the input voltage, and/or the output voltage.

In one embodiment, an ON time of the auxiliary switch increases according to at least one of the followings: (1) when the current related signal indicates that a peak current of the primary side switch is decreasing, (2) when the input voltage is increasing, and/or (3) when the output voltage is increasing, such that the auxiliary switch conducts a magnetizing current of a parasitic magnetizing inductance of the primary side winding to discharge a parasitic capacitor of the primary side switch, whereby the primary side switch is zero voltage switching when the primary side switch turns ON.

In one embodiment, the auxiliary switch control circuit includes: a threshold generator circuit, configured to operably generate a voltage threshold according to a reference voltage and the current related signal; a ramp generator circuit, configured to operably generate a ramp signal according to a reference current and the auxiliary switch control signal; a comparator circuit, configured to operably compare the ramp signal and the voltage threshold to generate a comparison result; and a logic circuit, configure to operably generate the auxiliary switch control signal according to the comparison result and an auxiliary switch start signal to control the auxiliary switch, such that an ON time of the auxiliary switch increases when the current related signal indicates that the peak current of the primary side switch is decreasing; wherein the conversion control circuit generates the auxiliary switch start signal according to a predetermined clock signal or a feedback signal.

In one embodiment, the conversion control circuit further includes a mode operation circuit, configured to operably control a switching frequency of the primary side switch according to at least one of the input voltage, the output voltage, the input current, and/or the output current, such that the flyback power converter circuit operates in a discontinuous conduction mode (DCM) or a quasi-resonant mode (QRM).

In one embodiment, the conversion control circuit further includes: a mode operation circuit, configured to operably determine a switching frequency of the primary side switch according to at least one of the input voltage, the output voltage, the input current, and/or the output current, wherein the switching frequency has an upper limit and a lower limit.

In one embodiment, the auxiliary switch control circuit triggers the auxiliary switch to turn ON according to an auxiliary switch start signal, wherein the conversion control circuit generates the auxiliary switch start signal according to a predetermined clock signal or a feedback signal; wherein the conversion control circuit further includes: a sequence circuit, configured to operably trigger the primary side switch to turn ON posterior to an auxiliary dead time after the auxiliary switch turns OFF according to an auxiliary switch related signal, wherein the auxiliary switch related signal is the auxiliary switch control signal or a signal related to the auxiliary switch control signal.

In one embodiment, the sequence circuit includes: a dead time control circuit, configured to operably generate a dead time control signal to determine the auxiliary dead time according to the auxiliary switch related signal, wherein both the primary side switch and the auxiliary switch are OFF during the auxiliary dead time; a primary side switch sequence control circuit, configured to operably generate the primary side switch control signal according to the dead time control signal and a primary side switch timing control signal, wherein the dead time control signal triggers the primary side switch control signal to turn ON the primary side switch, and the primary side switch timing control signal triggers the primary side switch control signal to turn OFF the primary side switch; and a primary side switch timing control circuit, configured to operably generate the primary side switch control signal according to the dead time control signal to determine the ON time of the primary side switch.

In one embodiment, the sequence circuit includes: a first sequence control circuit, configured to operably generate the auxiliary switch control signal according to the auxiliary switch start signal and a first timing control signal, wherein the auxiliary switch start signal triggers the auxiliary switch control signal to turn ON the auxiliary switch, and the first timing control signal triggers the auxiliary switch control signal to turn OFF the auxiliary switch; a first timing control circuit, configured to operably generate the first timing control signal according to the auxiliary switch start signal to determine the ON time of the auxiliary switch; a second timing control circuit, configured to generate a second timing control signal according to the first timing control signal to determine the auxiliary dead time, wherein both the primary side switch and the auxiliary switch are OFF during the auxiliary dead time; a second sequence control circuit, configured to operably generate the primary side switch control signal according to the second timing control signal and a third timing control signal, wherein the second timing control signal triggers the primary side switch control signal to turn ON the primary side switch, and the third timing control signal triggers the primary side switch control signal to turn OFF the primary side switch; and a third timing control circuit, configured to operably generate the third timing control signal according to the second timing control signal to determine an ON time of the primary side switch.

In one embodiment, the ON time of the primary side switch is controlled through a primary side feedback loop or a secondary side feedback loop.

From another perspective, the present invention provides a conversion control circuit, configured to operably control a flyback power converter circuit, the flyback power converter circuit including a transformer, which includes a primary side winding coupled to an input power and a secondary side winding coupled to an output node, wherein the input power includes an input voltage and an input current; a primary side switch, which is coupled to the primary side winding, and is configured to operably control the primary side winding to convert the input power such that the secondary side winding generates an output power on the output node, wherein the output power includes an output voltage and an output current; a clamping circuit, which includes an auxiliary switch and an auxiliary capacitor, the auxiliary capacitor being coupled to the auxiliary switch in series to form an auxiliary branch which is coupled with the primary side winding in parallel; the flyback power converter circuit further including the conversion control circuit, the conversion control circuit being configured to operably generate a primary side switch control signal and an auxiliary switch control signal to control the primary side switch and the auxiliary switch respectively to convert the input power to the output power, wherein the auxiliary switch and the primary side switch do not switch complementarily to each other; the conversion control circuit comprising: an auxiliary switch control circuit, configured to operably control the auxiliary switch according to at least one of the followings: (1) a current related signal, (2) the input voltage, and/or (3) the output voltage, such that a voltage difference between a current inflow terminal and a current outflow terminal of the primary side switch is substantially zero when the primary side switch turns ON, whereby zero voltage switching is achieved; wherein the current related signal relates to at least one of the followings: (1) the output current, (2) a conduction current of the primary side switch, and/or (3) a conduction current of the primary side winding; and a signal sensing circuit, configured to operably sense the current related signal, the input voltage, and/or the output voltage.

From another perspective, the present invention provides a flyback power converter circuit, comprising: a transformer, which includes a primary side winding coupled to an input power and a secondary side winding coupled to an output node, wherein the input power includes an input voltage and an input current; a primary side switch, coupled to the primary side winding, and is configured to operably control the primary side winding to convert the input power such that the secondary side winding generates an output power on the output node, wherein the output power includes an output voltage and an output current; a clamping circuit, including: an auxiliary switch; and an auxiliary capacitor, coupled to the auxiliary switch in series to form an auxiliary branch which is coupled with the primary side winding in parallel; and a conversion control circuit, configured to operably generate a primary side switch control signal and an auxiliary switch control signal according to a feedback signal to control the primary side switch and the auxiliary switch respectively to convert the input power to the output power; the conversion control circuit including: a sequence circuit, configured to operably trigger the auxiliary switch to turn ON according to an auxiliary switch start signal, and trigger the primary side switch to turn ON posterior to an auxiliary dead time after the auxiliary switch turns OFF, such that a voltage difference between a current inflow terminal and a current outflow terminal of the primary side switch is substantially zero when the primary side switch turns ON, whereby zero voltage switching is achieved; wherein the conversion control circuit generates the auxiliary switch start signal according to a predetermined clock signal or the feedback signal.

In one embodiment, the sequence circuit includes: a first sequence control circuit, configured to operably generate the auxiliary switch control signal according to the auxiliary switch start signal and a first timing control signal, wherein the auxiliary switch start signal triggers the auxiliary switch control signal to turn ON the auxiliary switch, and the first timing control signal triggers the auxiliary switch control signal to turn OFF the auxiliary switch; a first timing control circuit, configured to operably generate the first timing control signal according to the auxiliary switch start signal to determine the ON time of the auxiliary switch; a second timing control circuit, configured to generate a second timing control signal according to the first timing control signal to determine the auxiliary dead time, wherein both the primary side switch and the auxiliary switch are OFF during the auxiliary dead time; a second sequence control circuit, configured to operably generate the primary side switch control signal according to the second timing control signal and a third timing control signal, wherein the second timing control signal triggers the primary side switch control signal to turn ON the primary side switch, and the third timing control signal triggers the primary side switch control signal to turn OFF the primary side switch; and a third timing control circuit, configured to operably generate the third timing control signal according to the second timing control signal to determine an ON time of the primary side switch.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
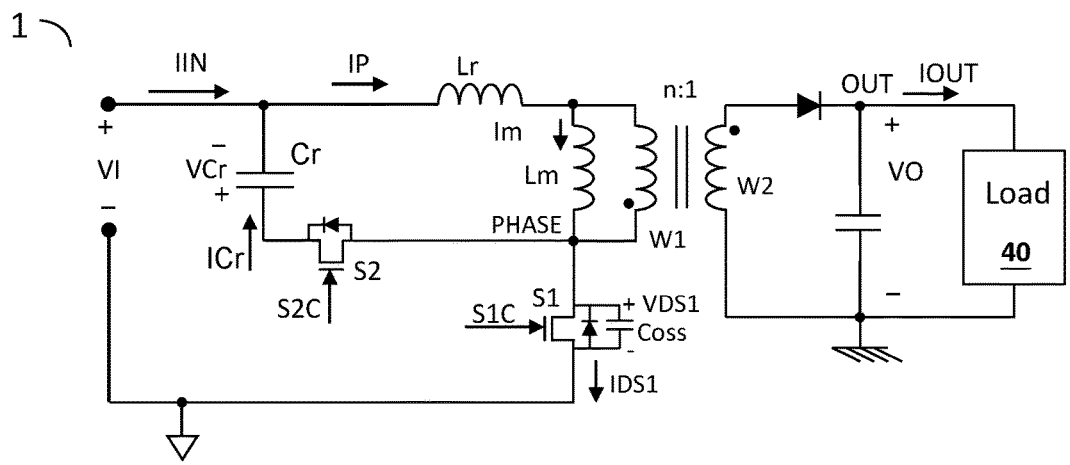
FIG. 1 shows a schematic diagram of a prior art flyback power converter circuit with active clamping and zero voltage switching.
Figure 2:
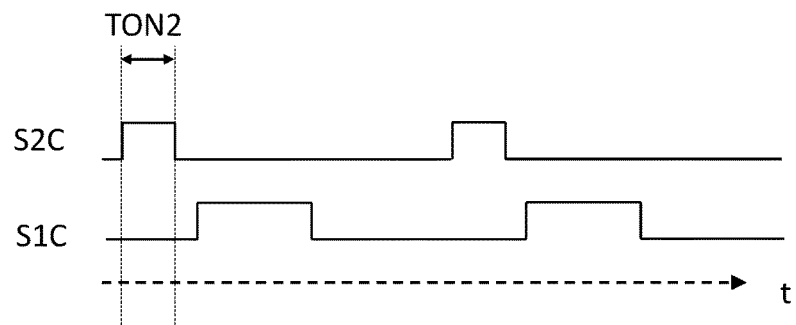
FIG. 2 shows schematic waveforms of a prior art flyback power converter circuit with active clamping and zero voltage switching.
Figure 3:
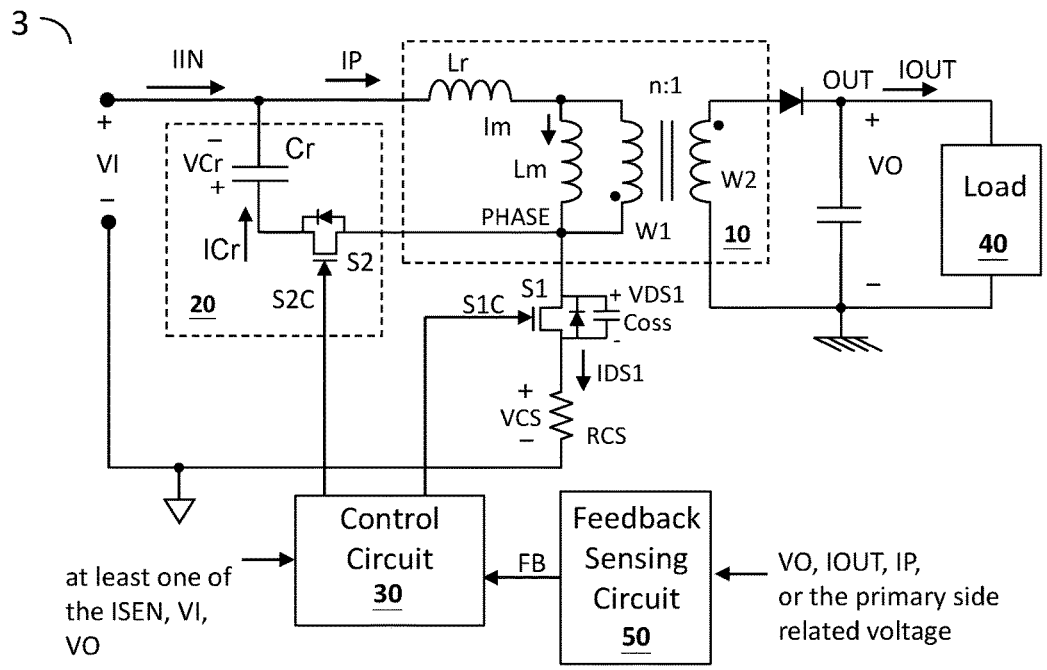
FIG. 3 shows a schematic diagram of an embodiment of the flyback power converter circuit according to the present invention.

FIG. 3 shows one embodiment of the flyback power converter circuit with active clamping and zero voltage switching according to the present invention (flyback power converter circuit 3). The flyback power converter circuit 3 comprises a transformer 10, a primary side switch S1, a clamping circuit 20, and a conversion control circuit 30. The transformer 10 includes a primary side winding W1 which is coupled to an input power, and a secondary side winding W2 which is coupled to an output node OUT, wherein the input power includes an input voltage VI and an input current IIN. The primary side switch S1 is coupled to the primary side winding W1, and is configured to operably control the primary side winding W1 to convert the input power such that the secondary side winding W2 generates an output power on the output node OUT for supplying the output power to a load 40, wherein the output power includes an output voltage VO and an output current IOUT.

Still referring to FIG. 3, the clamping circuit 20 includes an auxiliary switch S2 and an auxiliary capacitor Cr. The auxiliary switch S2 is coupled to the auxiliary capacitor Cr in series to form an auxiliary branch which is coupled with the primary side winding W1 in parallel as shown in FIG. 3. The conversion control circuit 30 generates a primary side switch control signal S1C and an auxiliary control signal S2C to control the primary side switch S1 and the auxiliary switch S2 respectively to convert the input power to the output power according to a feedback signal FB. The auxiliary switch S2 is ON for a period of time within an OFF period of the primary side switch S1, such that the energy stored in the parasitic leakage inductance Lr and/or the parasitic magnetizing inductance Lm of the primary side winding W1 during the ON time of the primary side switch S1 can be transferred and stored in the auxiliary capacitor Cr by this branch. Besides, before the primary side switch S1 is turned ON, the parasitic capacitor Coss of the primary side switch S1 can be discharged by the energy stored in the auxiliary capacitor Cr, such that the primary side switch S1 is zero voltage switching when turning ON.

According to the present invention, the conversion control circuit 30 adjusts an ON time TON2 of the auxiliary switch S2 according to at least one of the followings: (1) a current related signal ISEN, (2) the input voltage VI, and/or (3) the output voltage VO, such that a voltage difference (e.g. VDS1 as shown in FIG. 3) between a current inflow terminal (PHASE) and a current outflow terminal (which is coupled to a current sensing resistor RCS in this embodiment, and can be connected otherwise in other embodiments such as coupled to the primary side ground) of the primary side switch S1 is substantially zero when the primary side switch S1 turns ON, whereby zero voltage switching is achieved, wherein the current related signal ISEN relates to at least one of the followings: (1) the output current IOUT, (2) a conduction current IDS1 of the primary side switch S1, and/or (3) a conduction current IP of the primary side winding W1. In one embodiment, the current related signal ISEN may be obtained by sensing the drain-source voltage VDS1 of the primary side switch S1, the conduction current IDS1 of the primary side switch S1, or a voltage VCS across the sensing resistor RCS. "Substantially zero" means that there can be tolerable errors caused by, for example, signal transmission delay.

In one embodiment, the feedback signal FB relates to the output voltage VO or the output current IOUT, and in this case the feedback signal FB is obtained through a secondary side feedback loop; for example, the feedback signal FB can be generated by a feedback sensing circuit 50 which senses the output voltage VO or the output current IOUT to generate the feedback signal FB. In another embodiment, the feedback signal FB relates to the conduction current IP of the primary side winding W1 or the primary side related voltage (e.g. VDS1), and in this case the feedback signal FB is obtained through a primary side feedback loop, to determine the ON time TON1 of the primary side switch S1.

When operating in discontinuous conduction mode or quasi-resonant mode, for the primary side switch S1 to achieve zero voltage switching, the energy stored in the parasitic leakage inductance Lr and the parasitic magnetizing inductance Lm of the primary side winding W1 and the energy stored in the parasitic capacitor Coss should meet the following requirements:

$$\frac{1}{2} Lr \cdot Ipk^2 + \frac{1}{2} Lm \cdot Im^2 \geq \frac{1}{2} Coss \cdot (VI + n \cdot VO)^2 \quad \text{Eq. 1}$$

$$\text{wherein } Im = \frac{n \cdot VO}{Lm} \cdot TON2 \quad \text{Eq. 2}$$

and thus:

$$TON2 \geq \sqrt{\frac{[Coss \cdot (VI + n \cdot VO)^2 - Lr \cdot Ipk^2] \cdot Lm}{n \cdot VO}} \quad \text{Eq. 3}$$

In the above equations, Ipk indicates the peak current value of the conduction current IP of the primary side winding W1, and n indicates the turn ratio between the primary side winding W1 and the secondary side winding W2.

In some cases, for example when the input voltage VI is large, the energy transferred from the parasitic leakage inductance Lr and stored in the auxiliary capacitor Cr may be insufficient to fully discharge the parasitic capacitor Coss of the primary side switch S1 before the primary side switch S1 is turned ON, and hence the primary side switch S1 cannot achieve zero voltage switching. According to this invention, the energy stored in the parasitic magnetizing inductance Lm can be adjusted by adjusting the ON time TON2 of the auxiliary switch S2, such that the clamping circuit 20 can fully discharge the parasitic capacitor Coss of the primary side switch S1, whereby the primary side switch S1 can achieve zero voltage switching. The auxiliary ON time TON2 of the auxiliary switch S2 can be adjusted to increase according to at least one of the followings: (1) when the current related signal ISEN indicates that a peak current Ipk of the primary side switch S1 is decreasing, (2) when the input voltage VI is increasing, and/or (3) when the output voltage VO is increasing. From the above equations 1-3, the ON time TON2 of the auxiliary switch S2 can be properly determined, to conduct the magnetizing current of the parasitic magnetizing inductance Lm of the primary side winding W1 to fully discharge the parasitic capacitor Coss of the primary side switch S1, such that the primary side switch S1 is zero voltage switch when turning ON.

Note that adjusting the magnetizing current Im by adjusting the ON time TON2 is more effective in DCM or QRM. Hence, in one embodiment, the conversion control circuit 30 controls a switching frequency of the primary side switch S1 according to at least one of the input voltage VI, the output voltage VO, the input current IIN, and/or the output current IOUT, such that the flyback power converter circuit operates in DCM or QRM for achieving zero voltage switching.

Figure 4A:
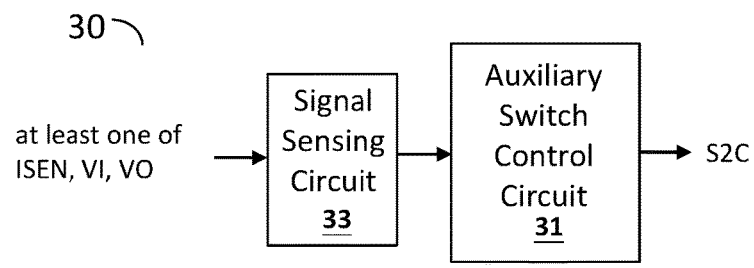
FIG. 4A shows a schematic diagram of an embodiment of the conversion control circuit of the flyback power converter circuit according to the present invention.

FIG. 4A shows a schematic diagram of a specific embodiment of the conversion control circuit (conversion control circuit 30) of the flyback power converter circuit according to the present invention. The conversion control circuit 30 includes an auxiliary switch control circuit 31 and a signal sensing circuit 33. The signal sensing circuit 33 senses at least one of the current related signal ISEN, the input voltage VI, and/or the output voltage VO. The auxiliary switch control circuit 31 generates the auxiliary switch control signal S2C according to an output of the sensing circuit 33 to adjust the ON time TON2 of the auxiliary switch S2, such that the primary side switch is zero voltage switching when turning ON.

Figure 4B:
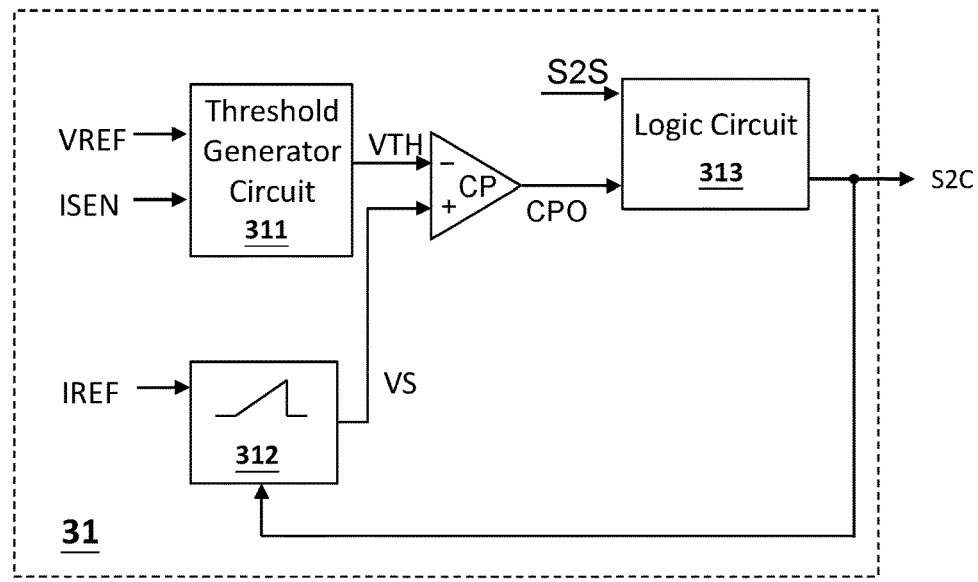
FIG. 4B shows a schematic diagram of an embodiment of the auxiliary switch control circuit of the flyback power converter circuit according to the present invention.

FIG. 4B shows a schematic diagram of a specific embodiment of the auxiliary switch control circuit (auxiliary switch control circuit 31) of the flyback power converter circuit according to the present invention. The auxiliary switch control circuit 31 includes a threshold generator circuit 311, a ramp generator circuit 312, a comparator circuit CP, and a logic circuit 313. The threshold generator circuit 311 generates a voltage threshold VTH according to a difference between a reference voltage VREF and the current related signal ISEN. In one embodiment, the voltage threshold is substantially reversely proportional to the current related signal ISEN. The ramp generator circuit 312 generates a ramp signal VS according to a reference current IREF and the auxiliary switch control signal S2C. The comparator circuit CP compares the ramp signal VS and the voltage threshold VTH to generate a comparison result CPO. The logic circuit 313 generates the auxiliary switch control signal S2C according to the comparison result CPO and an auxiliary switch start signal S2S, to control the auxiliary switch S2 such that the ON time TON2 of the auxiliary switch S2 increases when the current related signal ISEN indicates that the peak current Ipk of the primary side switch S1 is decreasing, such that the primary side switch S1 achieves zero voltage switching.

In one embodiment, the conversion control circuit 30 generates the auxiliary switch start signal S2S according to a predetermined clock signal CK. In one embodiment, the conversion control circuit 30 generates the auxiliary switch start signal S2S according to the feedback signal FB and/or the current related signal ISEN. For example, when the flyback power converter circuit operates at a fixed frequency, the predetermined clock signal CK can be generated by an internal oscillator. Or, when the flyback power converter circuit operates under for example but not limited to pulse frequency modulation (PFM), the auxiliary switch start signal S2S can be generated according to the feedback signal FB.

Figure 4C:
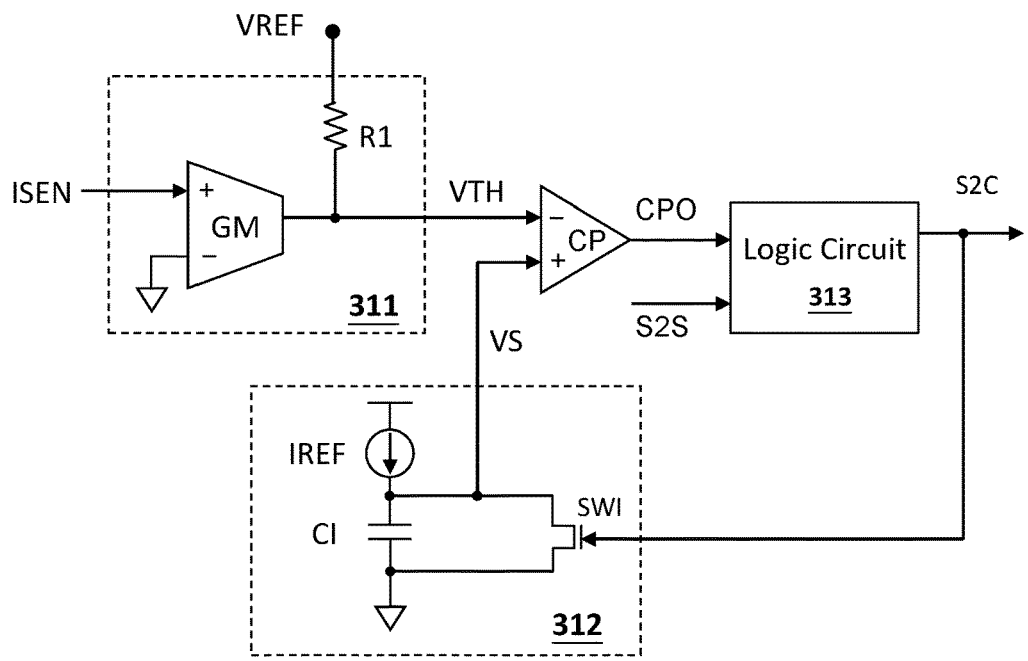
FIG. 4C shows a schematic diagram of an embodiment of the auxiliary switch control circuit of the flyback power converter circuit according to the present invention.
Figure 4D:
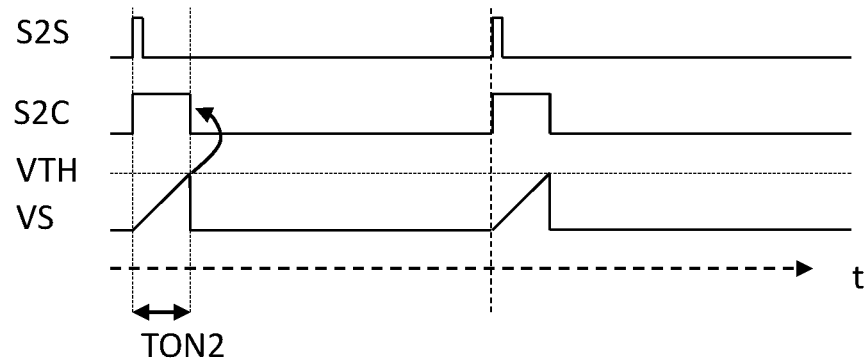
FIG. 4D shows schematic waveforms corresponding to the embodiment of FIG. 4C.

FIG. 4C shows a schematic diagram of a specific embodiment of the auxiliary switch control circuit (auxiliary switch control circuit 31) of the flyback power converter circuit according to the present invention. The threshold generator circuit 311 includes a transconductance amplifier circuit GM and a signal conversion resistor R1, which generate the voltage threshold VTH according to the difference between the reference voltage VREF and the current related signal ISEN, i.e., VTH=VREF−gm*R1*ISEN, wherein gm is the transconductance factor of the transconductance amplifier circuit GM. The ramp signal generator circuit 312 controls an integrator capacitor CI and an integrator switch SWI according to a reference current IREF and the auxiliary switch control signal S2C to generate the ramp signal VS. The ramp signal VS is compared to the voltage threshold VTH to determine the length of the ON time TON2 of the auxiliary switch S2. Also referring to FIG. 4D which shows schematic waveforms corresponding to the embodiment shown in FIG. 4C, in this embodiment, since the voltage threshold VTH is reversely proportional to the current related signal ISEN, the ON time TON2 of the auxiliary switch S2 increases when the current related signal ISEN indicates that the peak current of the primary side switch S1 is decreasing (and the ON time TON2 decreases when the peak current of the primary side switch S1 is increasing), such that the primary side switch S1 is zero voltage switching when turning ON.

Figure 5A:
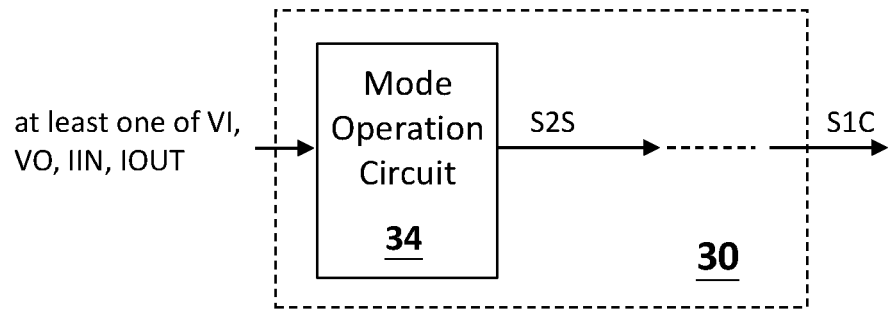
FIG. 5A shows a schematic diagram of a specific embodiment of the conversion control circuit of the flyback power converter circuit according to the present invention.
Figure 6A:
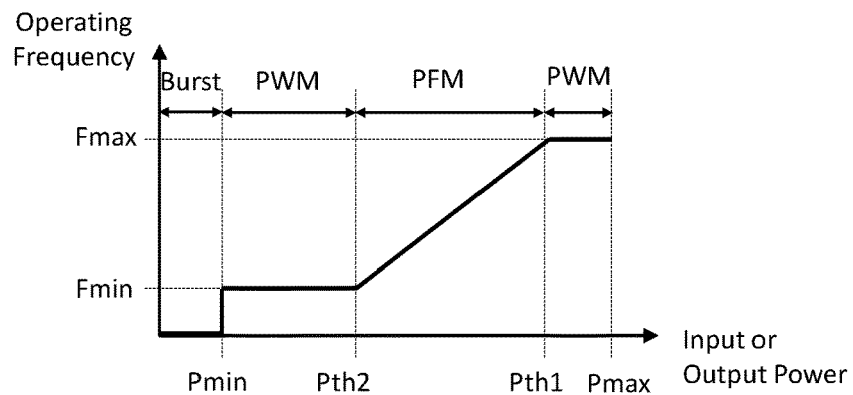
FIG. 6A shows a schematic diagram illustrating operation modes corresponding to the embodiments of FIGS. 5A and 5B.
Figure 6B:
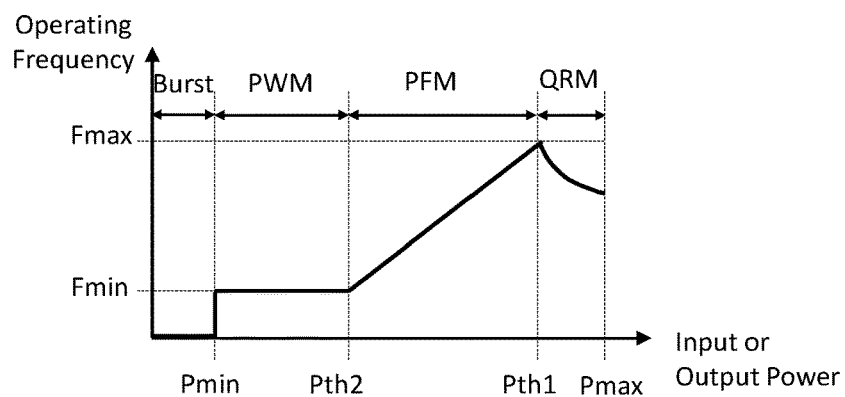
FIG. 6B shows a schematic diagram illustrating operation modes corresponding to the embodiments of FIGS. 5A and 5B.

FIG. 5A shows a schematic diagram of a specific embodiment of the conversion control circuit (conversion control circuit 30) of the flyback power converter circuit according to the present invention. The conversion control circuit 30 further includes a mode operation circuit 34. Also referring to FIGS. 6A and 6B, the mode operation circuit 34 determines a switching frequency of the primary side switch S1 (by for example but not limited to controlling the operating frequency of the auxiliary switch start signal S2S) according to at least one of the input voltage VI, the output voltage VO, the input current IIN, and/or the output current IOUT (i.e. corresponding to the input or output power shown in FIGS. 6A and 6B), such that the flyback power converter circuit can operate in various operation modes, for example but not limited to fixed or non-fixed frequency pulse width modulation (PWM) mode, PFM mode, QRM, or burst mode. The switching frequency of the primary side switch S1 preferably has an upper limit Fmax and a lower limit Fmin, In one embodiment, the mode operation circuit 34 controls the switching frequency of the primary side switch S1 according to at least one of the input voltage VI, the output voltage VO, the input current IIN, and/or the output current IOUT, such that the flyback power converter circuit operates in a discontinuous conduction mode (DCM) or a quasi-resonant mode (QRM) and the primary side switch S1 is zero voltage switching.

Figure 5B:
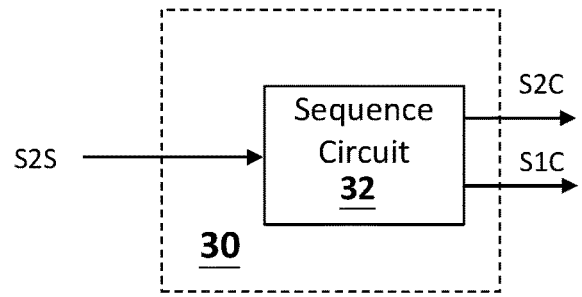
FIG. 5B shows a schematic diagram of another specific embodiment of the conversion control circuit of the flyback power converter circuit according to the present invention.

Referring to FIG. 5B, in one embodiment, the conversion control circuit 30 further includes a sequence circuit (sequence circuit 32) which triggers the auxiliary switch S2 to turn ON according to the auxiliary switch start signal S2S, and trigger the primary side switch S1 to turn ON posterior to an auxiliary dead time TD after the auxiliary switch S2 turns OFF.

From one perspective, the sequence circuit 32 operates to ensure that, before the primary side switch S1 turns ON, the auxiliary switch S2 has turned ON for a time period of TON2, and there is an auxiliary dead time TD between when the auxiliary switch S2 turns OFF and when the primary side switch S1 turns ON, to ensure zero voltage switching of the primary side switch S1.

Figure 5C:
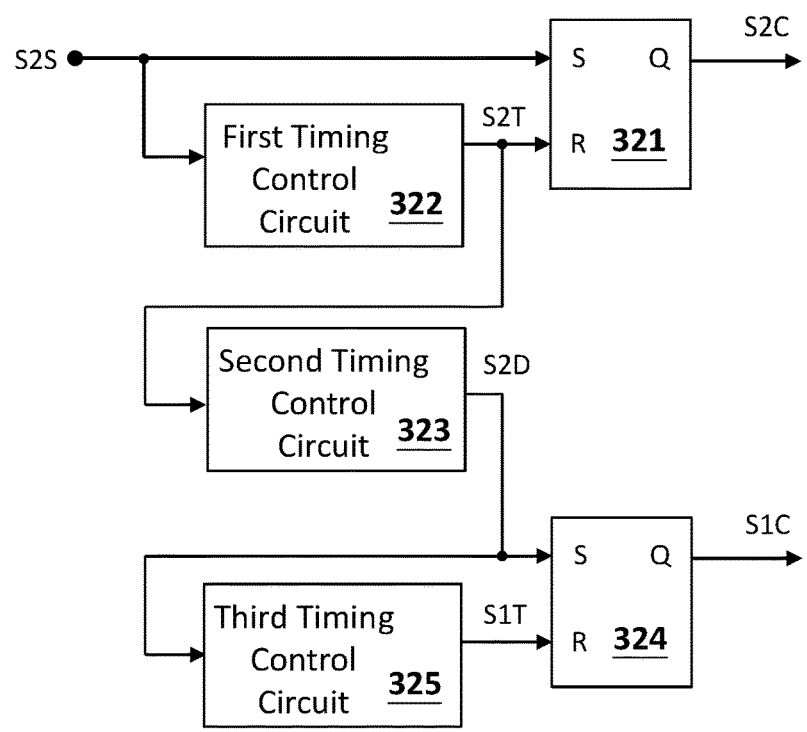
FIG. 5C shows a schematic diagram of a specific embodiment of the sequence circuit of the flyback power converter circuit according to the present invention.

FIG. 5C shows a schematic diagram of a specific embodiment of the sequence circuit (sequence circuit 32) of the flyback power converter circuit according to the present invention. The sequence circuit 32 includes a first sequence control circuit 321, a first timing control circuit 322, a second timing control circuit 323, a second sequence control circuit 324, and a third timing control circuit 325. The first sequence control circuit 321 (for example but not limited to the latch circuit as shown in the figure) generates the auxiliary switch control signal S2C according to the auxiliary switch start signal S2S and a first timing control signal S2T, wherein the auxiliary switch start signal S2S triggers the auxiliary switch control signal S2C to turn ON the auxiliary switch S2, and the first timing control signal S2T triggers the auxiliary switch control signal S2C to turn OFF the auxiliary switch S2. The first timing control circuit 322 generates the first timing control signal S2T according to the auxiliary switch start signal S2S to determine the ON time TON2 of the auxiliary switch S2. The second timing control circuit 323 generates a second timing control signal S2D according to the first timing control signal S2T to determine the auxiliary dead time TD, wherein both the primary side switch S1 and the auxiliary switch S2 are OFF during the auxiliary dead time TD. The second sequence control circuit 324 (for example but not limited to the latch circuit as shown in the figure) generates the primary side switch control signal S1C according to the second timing control signal S2D and a third timing control signal S1T, wherein the second timing control signal S2D triggers the primary side switch control signal S1C to turn ON the primary side switch S1, and the third timing control signal ST triggers the primary side switch control signal S1C to turn OFF the primary side switch S1. The third timing control circuit 325 determines the ON time TON1 of the primary side switch S1 according to the second timing control signal S2D. In one embodiment, the third timing control circuit 325 further generates the third timing control signal SIT according to the feedback signal FB and/or the current related signal ISEN. In one embodiment, the third timing control circuit 325 further determines the ON time TON1 of the primary side switch S1 according to the feedback signal FB and/or the current related signal ISEN.

Figure 5D:
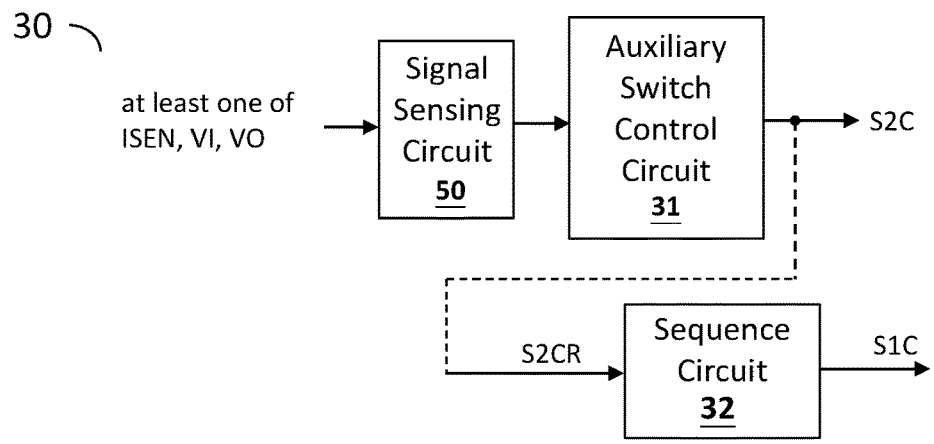
FIG. 5D shows a schematic diagram of another specific embodiment of the conversion control circuit of the flyback power converter circuit according to the present invention.

Referring to FIG. 5D, this embodiment is similar to that shown in FIG. 4A, but in this embodiment, the conversion control circuit 30 further includes a sequence circuit (sequence circuit 32). The sequence circuit 32 triggers the primary side switch S1 to turn ON posterior to an auxiliary dead time TD after the auxiliary switch S2 turns OFF, according to an auxiliary switch related signal S2CR. In one embodiment, the auxiliary switch related signal S2CR is the auxiliary switch control signal S2C. In another embodiment, the auxiliary switch related signal S2CR is a signal related to the auxiliary switch control signal S2C (for example but not limited to the comparison result CPO shown in FIG. 4B).

Figure 5E:
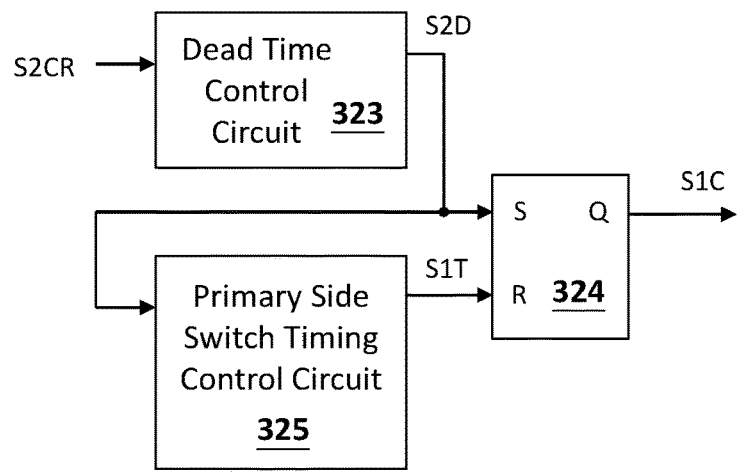
FIG. 5E shows a schematic diagram of another specific embodiment of the sequence circuit of the flyback power converter circuit according to the present invention.

FIG. 5E shows a schematic diagram of a specific embodiment of the sequence circuit (sequence circuit 32) corresponding to FIG. 5D. The sequence circuit 32 includes a dead time control circuit 323, a primary side switch sequence control circuit 324, and a primary side switch timing control circuit 325. The dead time control circuit 323 generates a dead time control signal S2D to determine the auxiliary dead time TD according to the auxiliary switch related signal S2CR, wherein both the primary side switch S1 and the auxiliary switch S2 are OFF during the auxiliary dead time TD. The primary side switch sequence control circuit 324 generates the primary side switch control signal S1C according to the dead time control signal S2D and a primary side switch timing control signal S1T, wherein the dead time control signal S2D triggers the primary side switch control signal S1C to turn ON the primary side switch S1, and the primary side switch timing control signal SIT triggers the primary side switch control signal S1C to turn OFF the primary side switch S1. The primary side switch timing control circuit 325 generates the primary side switch control signal S1T according to the dead time control signal S2D to determine the ON time TON1 of the primary side switch S1.

Figure 6C:
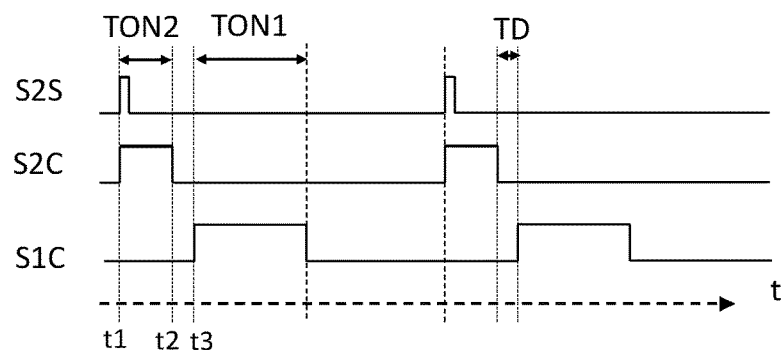
FIG. 6C shows schematic waveforms corresponding to the embodiments of the flyback power converter circuit of FIGS. 5A-5C.

FIG. 6C shows schematic waveforms corresponding to the embodiments of the flyback power converter circuit shown in FIGS. 5A-5E. As shown in the figure, the auxiliary switch start signal S2S triggers the auxiliary switch control signal S2C to turn ON the auxiliary switch S2 (e.g. t1 as shown in the figure). After the ON time TON2, the auxiliary switch control signal S2C turns OFF the auxiliary switch S2 (e.g. t2 as shown in the figure). After the auxiliary dead time TD during which both the primary side switch S1 and the auxiliary switch S2 are OFF, the primary side switch control signal S1C is triggered to turn ON the primary side switch S1 (e.g. t3 as shown in the figure). Note that the auxiliary switch S2 and the primary side switch S1 do not switch complementarily to each other, and the ON time TON2 is adjustable. In this embodiment, as described previously, the auxiliary switch start signal S2S may be generated according to a predetermined clock signal CK, the feedback signal FB, and/or the current related signal ISEN.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. As an example, the "sequence circuit" may be combined with the "auxiliary switch control circuit", the "mode operation circuit", and the "signal sensing circuit". In this case, the conversion control circuit may include a logic control circuit to integrate the control schemes provided by the aforementioned circuits for controlling the primary side switch S1 and/or the auxiliary switch S2. Furthermore, those skilled in this art can readily conceive variations and modifications within the spirit of the present invention. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:
1. A flyback power converter circuit, comprising:
a transformer, which includes a primary side winding coupled to an input power and a secondary side winding coupled to an output node, wherein the input power includes an input voltage and an input current;
a primary side switch, coupled to the primary side winding, and configured to operably control the primary side winding to convert the input power such that the secondary side winding generates an output power on the output node, wherein the output power includes an output voltage and an output current;
a clamping circuit, including:
an auxiliary switch; and
an auxiliary capacitor, coupled to the auxiliary switch in series to form an auxiliary branch which is coupled with the primary side winding in parallel; and
a conversion control circuit, configured to operably generate a primary side switch control signal and an auxiliary switch control signal to control the primary side switch and the auxiliary switch respectively to convert the input power to the output power, wherein the auxiliary switch and the primary side switch do not switch complementarily to each other, the conversion control circuit including:
an auxiliary switch control circuit, configured to operably control the auxiliary switch according to at least one of the followings: (1) a current related signal, (2) the input voltage, and/or (3) the output voltage, such that a voltage difference between a current inflow terminal and a current outflow terminal of the primary side switch is substantially zero when the primary side switch turns ON, whereby zero voltage switching is achieved, wherein the current related signal relates to at least one of the followings: (1) the output current, (2) a conduction current of the primary side switch, and/or (3) a conduction current of the primary side winding; and
a signal sensing circuit, configured to operably sense the current related signal, the input voltage, and/or the output voltage;
wherein an ON time of the auxiliary switch increases according to at least one of the followings: (1) when the current related signal indicates that a peak current of the primary side switch is decreasing, (2) when the input voltage is increasing, and/or (3) when the output voltage is increasing,
such that the auxiliary switch conducts a magnetizing current of a parasitic magnetizing inductance of the primary side winding to discharge a parasitic capacitor of the primary side switch, whereby the primary side switch is zero voltage switching when the primary side switch turns ON.
2. The flyback power converter circuit of claim 1, wherein the auxiliary switch control circuit generates a voltage threshold according to the current related signal and determines the ON time of the auxiliary switch according to the voltage threshold, wherein the voltage threshold is substantially reversely proportional to the current related signal.
3. A flyback power converter circuit, comprising:
a transformer, which includes a primary side winding coupled to an input power and a secondary side winding coupled to an output node, wherein the input power includes an input voltage and an input current;
a primary side switch, coupled to the primary side winding, and configured to operably control the primary side winding to convert the input power such that the secondary side winding generates an output power on the output node, wherein the output power includes an output voltage and an output current;
a clamping circuit, including:
an auxiliary switch; and
an auxiliary capacitor, coupled to the auxiliary switch in series to form an auxiliary branch which is coupled with the primary side winding in parallel; and
a conversion control circuit, configured to operably generate a primary side switch control signal and an auxiliary switch control signal to control the primary side switch and the auxiliary switch respectively to convert the input power to the output power, wherein the auxiliary switch and the primary side switch do not switch complementarily to each other, the conversion control circuit including:
an auxiliary switch control circuit, configured to operably control the auxiliary switch according to at least one of the followings: (1) a current related signal, (2) the input voltage, and/or (3) the output voltage, such that a voltage difference between a current inflow terminal and a current outflow terminal of the primary side switch is substantially zero when the primary side switch turns ON, whereby zero voltage switching is achieved, wherein the current related signal relates to at least one of the followings: (1) the output current, (2) a conduction current of the primary side switch, and/or (3) a conduction current of the primary side winding; and
a signal sensing circuit, configured to operably sense the current related signal, the input voltage, and/or the output voltage;
wherein the auxiliary switch control circuit includes:
a threshold generator circuit, configured to operably generate a voltage threshold according to a reference voltage and the current related signal;
a ramp generator circuit, configured to operably generate a ramp signal according to a reference current and the auxiliary switch control signal;
a comparator circuit, configured to operably compare the ramp signal and the voltage threshold to generate a comparison result; and
a logic circuit, configure to operably generate the auxiliary switch control signal according to the comparison result and an auxiliary switch start signal to control the auxiliary switch, such that an ON time of the auxiliary switch increases when the current related signal indicates that the peak current of the primary side switch is decreasing;
wherein the conversion control circuit generates the auxiliary switch start signal according to a predetermined clock signal or a feedback signal.

4. The flyback power converter circuit of claim 1, wherein the conversion control circuit further includes a mode operation circuit, configured to operably control a switching frequency of the primary side switch according to at least one of the input voltage, the output voltage, the input current, and/or the output current, such that the flyback power converter circuit operates in a discontinuous conduction mode (DCM) or a quasi-resonant mode (QRM).

5. The flyback power converter circuit of claim 1, wherein the conversion control circuit further includes:
a mode operation circuit, configured to operably determine a switching frequency of the primary side switch according to at least one of the input voltage, the output voltage, the input current, and/or the output current, wherein the switching frequency has an upper limit and a lower limit.

6. The flyback power converter circuit of claim 1, wherein the auxiliary switch control circuit triggers the auxiliary switch to turn ON according to an auxiliary switch start signal, wherein the conversion control circuit generates the auxiliary switch start signal according to a predetermined clock signal or a feedback signal;
wherein the conversion control circuit further includes:
a sequence circuit, configured to operably trigger the primary side switch to turn ON posterior to an auxiliary dead time after the auxiliary switch turns OFF according to an auxiliary switch related signal, wherein the auxiliary switch related signal is the auxiliary switch control signal or a signal related to the auxiliary switch control signal.

7. A flyback power converter circuit, comprising:
a transformer, which includes a primary side winding coupled to an input power and a secondary side winding coupled to an output node, wherein the input power includes an input voltage and an input current;
a primary side switch, coupled to the primary side winding, and configured to operably control the primary side winding to convert the input power such that the secondary side winding generates an output power on the output node, wherein the output power includes an output voltage and an output current;
a clamping circuit, including:
an auxiliary switch; and
an auxiliary capacitor, coupled to the auxiliary switch in series to form an auxiliary branch which is coupled with the primary side winding in parallel; and
a conversion control circuit, configured to operably generate a primary side switch control signal and an auxiliary switch control signal to control the primary side switch and the auxiliary switch respectively to convert the input power to the output power, wherein the auxiliary switch and the primary side switch do not switch complementarily to each other, the conversion control circuit including:
an auxiliary switch control circuit, configured to operably control the auxiliary switch according to at least one of the followings: (1) a current related signal, (2) the input voltage, and/or (3) the output voltage, such that a voltage difference between a current inflow terminal and a current outflow terminal of the primary side switch is substantially zero when the primary side switch turns ON, whereby zero voltage switching is achieved, wherein the current related signal relates to at least one of the followings: (1) the output current, (2) a conduction current of the primary side switch, and/or (3) a conduction current of the primary side winding; and
a signal sensing circuit, configured to operably sense the current related signal, the input voltage, and/or the output voltage;
wherein the auxiliary switch control circuit triggers the auxiliary switch to turn ON according to an auxiliary switch start signal, wherein the conversion control circuit generates the auxiliary switch start signal according to a predetermined clock signal or a feedback signal;
wherein the conversion control circuit further includes:
a sequence circuit, configured to operably trigger the primary side switch to turn ON posterior to an auxiliary dead time after the auxiliary switch turns OFF according to an auxiliary switch related signal, wherein the auxiliary switch related signal is the auxiliary switch control signal or a signal related to the auxiliary switch control signal;

wherein the sequence circuit includes:

a dead time control circuit, configured to operably generate a dead time control signal to determine the auxiliary dead time according to the auxiliary switch related signal, wherein both the primary side switch and the auxiliary switch are OFF during the auxiliary dead time;

a primary side switch sequence control circuit, configured to operably generate the primary side switch control signal according to the dead time control signal and a primary side switch timing control signal, wherein the dead time control signal triggers the primary side switch control signal to turn ON the primary side switch, and the primary side switch timing control signal triggers the primary side switch control signal to turn OFF the primary side switch; and a primary side switch timing control circuit, configured to operably generate the primary side switch control signal according to the dead time control signal to determine the ON time of the primary side switch.

8. The flyback power converter circuit of claim 1, wherein the ON time of the primary side switch is controlled through a primary side feedback loop or a secondary side feedback loop.

9. A conversion control circuit, configured to operably control a flyback power converter circuit, the flyback power converter circuit including a transformer, which includes a primary side winding coupled to an input power and a secondary side winding coupled to an output node, wherein the input power includes an input voltage and an input current; a primary side switch, which is coupled to the primary side winding, and is configured to operably control the primary side winding to convert the input power such that the secondary side winding generates an output power on the output node, wherein the output power includes an output voltage and an output current; a clamping circuit, which includes an auxiliary switch and an auxiliary capacitor, the auxiliary capacitor being coupled to the auxiliary switch in series to form an auxiliary branch which is coupled with the primary side winding in parallel; the flyback power converter circuit further including the conversion control circuit, the conversion control circuit being configured to operably generate a primary side switch control signal and an auxiliary switch control signal to control the primary side switch and the auxiliary switch respectively to convert the input power to the output power, wherein the auxiliary switch and the primary side switch do not switch complementarily to each other; the conversion control circuit comprising:

an auxiliary switch control circuit, configured to operably control the auxiliary switch according to at least one of the followings: (1) a current related signal, (2) the input voltage, and/or (3) the output voltage, such that a voltage difference between a current inflow terminal and a current outflow terminal of the primary side switch is substantially zero when the primary side switch turns ON, whereby zero voltage switching is achieved; wherein the current related signal relates to at least one of the followings: (1) the output current, (2) a conduction current of the primary side switch, and/or (3) a conduction current of the primary side winding; and a signal sensing circuit, configured to operably sense the current related signal, the input voltage, and/or the output voltage wherein an ON time of the auxiliary switch increases according to at least one of the followings: (1) when the current related signal indicates that a peak current of the primary side switch is decreasing, (2) when the input voltage is increasing, and/or (3) when the output voltage is increasing, such that the auxiliary switch conducts a magnetizing current of a parasitic magnetizing inductance of the primary side winding to discharge a parasitic capacitor of the primary side switch, whereby the primary side switch is zero voltage switching when the primary side switch turns ON.

10. The conversion control circuit of claim 9, wherein the auxiliary switch control circuit generates a voltage threshold according to the current related signal and determines the ON time of the auxiliary switch according to the voltage threshold, wherein the voltage threshold is substantially reversely proportional to the current related signal.

11. A conversion control circuit, configured to operably control a flyback power converter circuit, the flyback power converter circuit including a transformer, which includes a primary side winding coupled to an input power and a secondary side winding coupled to an output node, wherein the input power includes an input voltage and an input current; a primary side switch, which is coupled to the primary side winding, and is configured to operably control the primary side winding to convert the input power such that the secondary side winding generates an output power on the output node, wherein the output power includes an output voltage and an output current; a clamping circuit, which includes an auxiliary switch and an auxiliary capacitor, the auxiliary capacitor being coupled to the auxiliary switch in series to form an auxiliary branch which is coupled with the primary side winding in parallel; the flyback power converter circuit further including the conversion control circuit, the conversion control circuit being configured to operably generate a primary side switch control signal and an auxiliary switch control signal to control the primary side switch and the auxiliary switch respectively to convert the input power to the output power, wherein the auxiliary switch and the primary side switch do not switch complementarily to each other; the conversion control circuit comprising:

an auxiliary switch control circuit, configured to operably control the auxiliary switch according to at least one of the followings: (1) a current related signal, (2) the input voltage, and/or (3) the output voltage, such that a voltage difference between a current inflow terminal and a current outflow terminal of the primary side switch is substantially zero when the primary side switch turns ON, whereby zero voltage switching is achieved; wherein the current related signal relates to at least one of the followings: (1) the output current, (2) a conduction current of the primary side switch, and/or (3) a conduction current of the primary side winding; and a signal sensing circuit, configured to operably sense the current related signal, the input voltage, and/or the output voltage;

wherein the auxiliary switch control circuit includes:
a threshold generator circuit, configured to operably generate a voltage threshold according to a reference voltage and the current related signal;
a ramp generator circuit, configured to operably generate a ramp signal according to a reference current and the auxiliary switch control signal;
a comparator circuit, configured to operably compare the ramp signal and the voltage threshold to generate a comparison result; and
a logic circuit, configure to operably generate the auxiliary switch control signal according to the comparison result and an auxiliary switch start signal to control the auxiliary switch, such that an ON time of the auxiliary switch increases when the current related signal indicates that the peak current of the primary side switch is decreasing;
wherein the conversion control circuit generates the auxiliary switch start signal according to a predetermined clock signal or a feedback signal.

12. The conversion control circuit of claim 9, wherein the conversion control circuit further includes a mode operation circuit, configured to operably control a switching frequency of the primary side switch according to at least one of the input voltage, the output voltage, the input current, and/or the output current, such that the flyback power converter circuit operates in a discontinuous conduction mode (DCM) or a quasi-resonant mode (QRM).

13. The conversion control circuit of claim 9, wherein the conversion control circuit further includes:
a mode operation circuit, configured to operably determine a switching frequency of the primary side switch according to at least one of the input voltage, the output voltage, the input current, and/or the output current, wherein the switching frequency has an upper limit and a lower limit.

14. The conversion control circuit of claim 9, wherein the auxiliary switch control circuit triggers the auxiliary switch to turn ON according to an auxiliary switch start signal, wherein the conversion control circuit generates the auxiliary switch start signal according to a predetermined clock signal or a feedback signal;
wherein the conversion control circuit further includes:
a sequence circuit, configured to operably trigger the primary side switch to turn ON posterior to an auxiliary dead time after the auxiliary switch turns OFF according to an auxiliary switch related signal, wherein the auxiliary switch related signal is the auxiliary switch control signal or a signal related to the auxiliary switch control signal.

15. A conversion control circuit, configured to operably control a flyback power converter circuit, the flyback power converter circuit including a transformer, which includes a primary side winding coupled to an input power and a secondary side winding coupled to an output node, wherein the input power includes an input voltage and an input current; a primary side switch, which is coupled to the primary side winding, and is configured to operably control the primary side winding to convert the input power such that the secondary side winding generates an output power on the output node, wherein the output power includes an output voltage and an output current; a clamping circuit, which includes an auxiliary switch and an auxiliary capacitor, the auxiliary capacitor being coupled to the auxiliary switch in series to form an auxiliary branch which is coupled with the primary side winding in parallel; the flyback power converter circuit further including the conversion control circuit, the conversion control circuit being configured to operably generate a primary side switch control signal and an auxiliary switch control signal to control the primary side switch and the auxiliary switch respectively to convert the input power to the output power, wherein the auxiliary switch and the primary side switch do not switch complementarily to each other; the conversion control circuit comprising:
an auxiliary switch control circuit, configured to operably control the auxiliary switch according to at least one of the followings: (1) a current related signal, (2) the input voltage, and/or (3) the output voltage, such that a voltage difference between a current inflow terminal and a current outflow terminal of the primary side switch is substantially zero when the primary side switch turns ON, whereby zero voltage switching is achieved; wherein the current related signal relates to at least one of the followings: (1) the output current, (2) a conduction current of the primary side switch, and/or (3) a conduction current of the primary side winding; and
a signal sensing circuit, configured to operably sense the current related signal, the input voltage, and/or the output voltage;
wherein the auxiliary switch control circuit triggers the auxiliary switch to turn ON according to an auxiliary switch start signal, wherein the conversion control circuit generates the auxiliary switch start signal according to a predetermined clock signal or a feedback signal;
wherein the conversion control circuit further includes:
a sequence circuit, configured to operably trigger the primary side switch to turn ON posterior to an auxiliary dead time after the auxiliary switch turns OFF according to an auxiliary switch related signal, wherein the auxiliary switch related signal is the auxiliary switch control signal or a signal related to the auxiliary switch control signal;
wherein the sequence circuit includes:
a dead time control circuit, configured to operably generate a dead time control signal to determine the auxiliary dead time according to the auxiliary switch related signal, wherein both the primary side switch and the auxiliary switch are OFF during the auxiliary dead time;
a primary side switch sequence control circuit, configured to operably generate the primary side switch control signal according to the dead time control signal and a primary side switch timing control signal, wherein the dead time control signal triggers the primary side switch control signal to turn ON the primary side switch, and the primary side switch timing control signal triggers the primary side switch control signal to turn OFF the primary side switch; and
a primary side switch timing control circuit, configured to operably generate the primary side switch control signal according to the dead time control signal to determine the ON time of the primary side switch.

16. The conversion control circuit of claim 9, wherein the ON time of the primary side switch is controlled through a primary side feedback loop or a secondary side feedback loop.

17. A flyback power converter circuit, comprising:
a transformer, which includes a primary side winding coupled to an input power and a secondary side winding coupled to an output node, wherein the input power includes an input voltage and an input current;
a primary side switch, coupled to the primary side winding, and configured to operably control the primary side winding to convert the input power such that the secondary side winding generates an output power on the output node, wherein the output power includes an output voltage and an output current;
a clamping circuit, including:
  an auxiliary switch; and
  an auxiliary capacitor, coupled to the auxiliary switch in series to form an auxiliary branch which is coupled with the primary side winding in parallel; and
a conversion control circuit, configured to operably generate a primary side switch control signal and an auxiliary switch control signal according to a feedback signal to control the primary side switch and the auxiliary switch respectively to convert the input power to the output power; the conversion control circuit including:
  a sequence circuit, configured to operably trigger the auxiliary switch to turn ON according to an auxiliary switch start signal, and trigger the primary side switch to turn ON posterior to an auxiliary dead time after the auxiliary switch turns OFF, such that the turning-ON timing of the primary side switch is determined according to the turning-OFF timing of the auxiliary switch plus the auxiliary dead time, and such that a voltage difference between a current inflow terminal and a current outflow terminal of the primary side switch is substantially zero when the primary side switch turns ON, whereby zero voltage switching is achieved; wherein the conversion control circuit generates the auxiliary switch start signal according to a predetermined clock signal or the feedback signal.

18. The flyback power converter circuit of claim 17, wherein the conversion control circuit further includes:
a mode operation circuit, configured to operably determine a switching frequency of the auxiliary switch start signal according to at least one of the input voltage, the output voltage, the input current, and/or the output current, wherein the switching frequency has an upper limit and a lower limit.

19. A flyback power converter circuit, comprising:
a transformer, which includes a primary side winding coupled to an input power and a secondary side winding coupled to an output node, wherein the input power includes an input voltage and an input current;
a primary side switch, coupled to the primary side winding, and configured to operably control the primary side winding to convert the input power such that the secondary side winding generates an output power on the output node, wherein the output power includes an output voltage and an output current;
a clamping circuit, including:
  an auxiliary switch; and
  an auxiliary capacitor, coupled to the auxiliary switch in series to form an auxiliary branch which is coupled with the primary side winding in parallel; and
a conversion control circuit, configured to operably generate a primary side switch control signal and an auxiliary switch control signal according to a feedback signal to control the primary side switch and the auxiliary switch respectively to convert the input power to the output power; the conversion control circuit including:
  a sequence circuit, configured to operably trigger the auxiliary switch to turn ON according to an auxiliary switch start signal, and trigger the primary side switch to turn ON posterior to an auxiliary dead time after the auxiliary switch turns OFF, such that a voltage difference between a current inflow terminal and a current outflow terminal of the primary side switch is substantially zero when the primary side switch turns ON, whereby zero voltage switching is achieved; wherein the conversion control circuit generates the auxiliary switch start signal according to a predetermined clock signal or the feedback signal;
wherein the sequence circuit includes:
  a first sequence control circuit, configured to operably generate the auxiliary switch control signal according to the auxiliary switch start signal and a first timing control signal, wherein the auxiliary switch start signal triggers the auxiliary switch control signal to turn ON the auxiliary switch, and the first timing control signal triggers the auxiliary switch control signal to turn OFF the auxiliary switch;
  a first timing control circuit, configured to operably generate the first timing control signal according to the auxiliary switch start signal to determine the ON time of the auxiliary switch;
  a second timing control circuit, configured to generate a second timing control signal according to the first timing control signal to determine the auxiliary dead time, wherein both the primary side switch and the auxiliary switch are OFF during the auxiliary dead time;
  a second sequence control circuit, configured to operably generate the primary side switch control signal according to the second timing control signal and a third timing control signal, wherein the second timing control signal triggers the primary side switch, and the third timing control signal triggers the primary side switch control signal to turn OFF the primary side switch; and
  a third timing control circuit, configured to operably generate the third timing control signal according to the second timing control signal to determine an ON time of the primary side switch.

* * * * *